United States Patent Office 3,514,571
Patented May 26, 1970

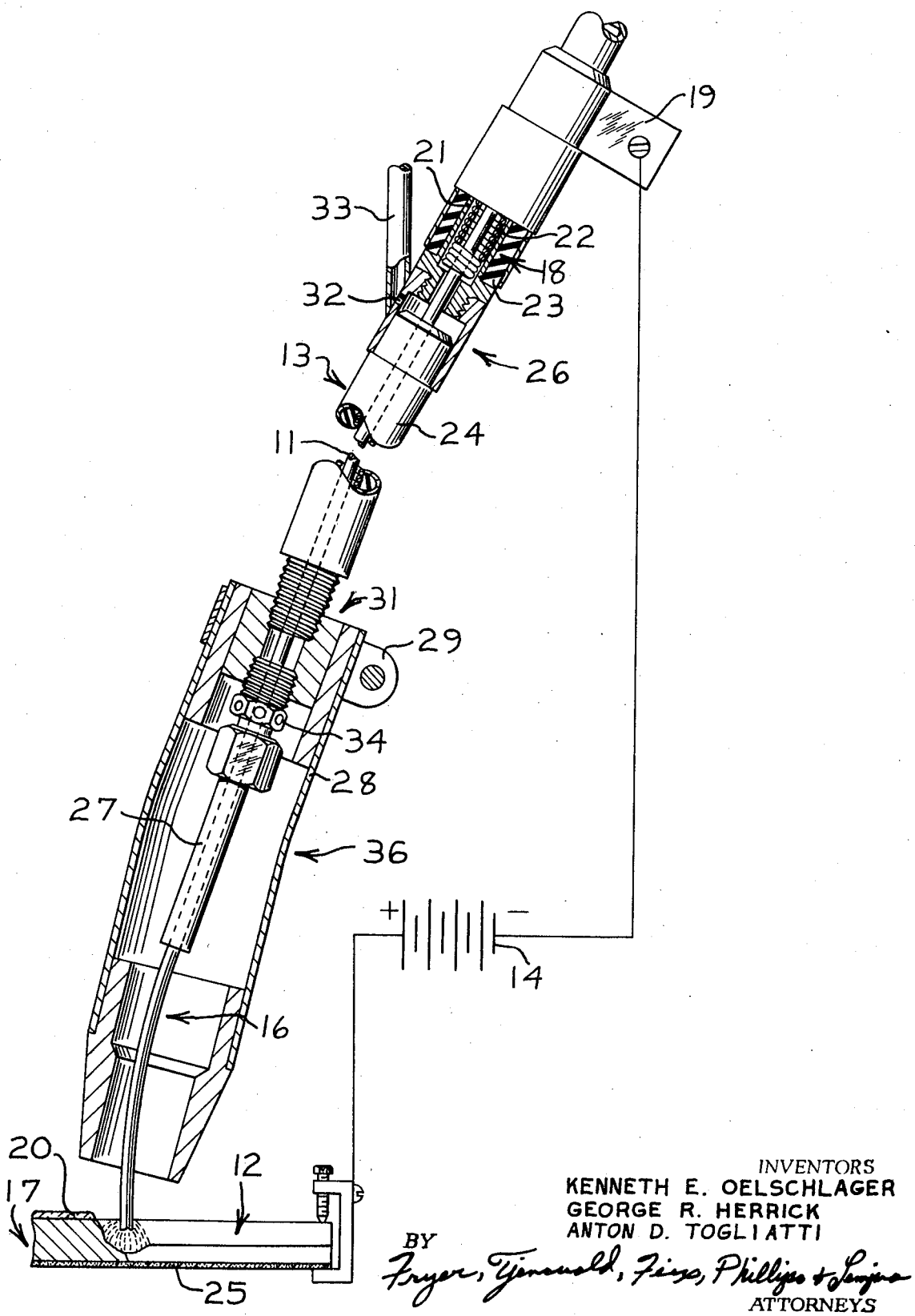

3,514,571
GAS SHIELDED ARC WELDING APPARATUS
Kenneth E. Oelschlager, Campus, George R. Herrick, Mazon, and Anton D. Togliatti, Coal City, Ill., assignors to Caterpillar Tractor Co., Peoria, Ill., a corporation of California
Filed Apr. 12, 1968, Ser. No. 720,763
Int. Cl. B23k 9/00
U.S. Cl. 219—137                        6 Claims

ABSTRACT OF THE DISCLOSURE

Apparatus for versatile gas shielded arc welding to provide good weld characteristics and a high deposition rate in a variety of weld joints. Flux cored wire is maintained with its arc forming end sufficiently extended from the welding gun so that it is substantially softened along its exposed length by resistance heating. Negative polarity is employed along with shielding gas of generally pure carbon dioxide. A tubular nozzle surrounds the extended flux cored wire to conduct the gas to cover the arc forming end of the wire. A method of gas shielded arc welding employing negatively polarized flux cored wire and resistive or $I^2R$ heating of the wire.

---

One method for increasing the deposition rate in arc welding is to maintain the arc forming end of the welding wire at an extended length from the electrical contact member of the welding gun. Each portion of the extended length of the wire is substantially softened by resistance or $I^2R$ heating prior to its becoming the arc forming end of the wire. Thus, the time and energy necessary to condition the end of the wire for deposition is reduced and the deposition rate is accordingly increased. This technique has been employed with solid wire in submerged arc welding apparatus in the past. Submerging of the arc effectively regulates cooling of the weld, prevents cracking and otherwise enhances the finished weld characteristics. However, the submerged arc process is not generally adaptable to a wide variety of applications. For example, submerging of the arc prevents visual inspection by the operator so that the process is best suited to automatic control.

On the other hand, gas shielded welding is a more versatile process. In contrast with submerged arc welding, conventional gas shielded welding permits visual inspection so that the process may be automatically or manually controlled. Further, construction and operation of gas shielded welding equipment is simpler.

The present invention combines resistance heating of extended welding wire with gas shielding techniques to retain the advantages of gas shielded welding as described above and permit substantially increase deposition rates. The present welding apparatus further permits welding in a variety of applications. For example, beside being suitable for automatic operation, the welding process may be semiautomatic. The welding gun may be hand held and completely controlled by the welder. Welding may be accomplished in all types of standard weld joints such as bevel, fillet, J-joint or groove without the need for side walls in the weld joint to stabilize the arc or help confine spatter. The versatility and increased deposition rates permitted by the invention have not been possible in the prior art. The present combination of features might previously have been expected to result in poor arc stability, for example, which in turn would lead to inefficient and annoying spatter as well as poor weld characeristics such as cracking, cold lap and poor bead shape and appearance.

The present invention resides in the use of extended flux cored wire employed with negative polarity and gas shielding of the arc forming end of the wire. Preferably, the shielding gas is substantially pure carbon dioxide. The flux cored wire is also preferably exposed to the shielding gas along its extended or unsupported length. A tubular nozzle extending from the welding gun and surrounding the wire almost to its extended end is shaped to avoid electrical contact with the wire and to provide for effective coverage of the arc by the shielding gas.

It is accordingly an object of the invention to provide arc welding apparatus adaptable to a variety of applications. It is a further object to deposit weld metals at substantially increased rates. It is also an object to provide a method of gas shielded arc welding employing flux cored welding wire and negative polarity.

Other objects and advantages of the invention are made apparent in the following description having reference to the accompanying drawing which is a side elevation view, with parts in section, of welding apparatus comprising a welding gun for feeding flux cored wire into arc forming contact.

Referring now to the drawing, conventional flux cored wire 11 is to be fed into arc forming contact with material of a suitable weld joint, such as that shown at 12, by a semi-automatic hand held welding gun 13, for example. Suitable means such as a D.C. power source 14 are connected with the weld joint material and the gun to provide negative polarity during welding and to provide resistance heating of an extended length 16 of the wire as discussed in greater detail below. The gun 13 includes conventional means (not shown) for automatically feeding the flux cored welding wire toward the joint at a selected rate for deposition of weld metal 17 under a flux coating 20. Backup material 25, normally composed of sand, for example, is maintained beneath the joint 12 during welding to prevent loss of molten weld metal from the joint and to assist in formation of a bead. The gun is also adapted to conduct shielding gas, from a source (not shown), to cover the arc during welding.

The wire is threaded through a conductive cable 18 which is connected to the source 14 by a tab 19 and comprises a conductive tube 21 and a coiled element 22 through which the welding wire may slide. The cable is encased in insulating material 23 and is connected to a gooseneck member 24 of similar construction by a conductive adapter assembly 26. The welding wire travels through the cable 18 and the gooseneck member 24 and exits through an electrical contact member 27 mounted at the end of the gooseneck. The member 27 ensures electrical contact with the wire 11 so that, after an arc is struck at the extended end of the wire, the wire experiences resistance heating only along its extended length 16 to insure uniform softening. As discussed in greater detail below, a nozzle 28 is adjustably secured by clamp means 29 to an insulator 31 mounted at the end of the gooseneck member 24. The adapter assembly 26 is hollow and ported at 32 to receive shielding gas from a conduit 33. The gooseneck member 24 is sufficiently large so that the gas passes through its length about the wire and is delivered into the nozzle through a plurality of radial ports 34 formed in the gooseneck member adjacent the electrical contact member 27.

The nozzle 28 performs at least two functions. Firstly, it extends from the gooseneck member 24 past the electrical contact member 27 to surround the exposed and extended length 16 of the wire almost to its arc forming end. Since the outer end of the nozzle is maintained adjacent the weld joint 12, it effectively controls the extended length 16 of the wire and helps to maintain constant resistive heating of the extended wire. Adjustment of the position in which the nozzle is secured to the gooseneck by the clamp 29, accommodates different extended lengths of the welding wire. Secondly, the weld gun is illustrated in a position with the electrical conductor member 27 maintained at an inclined angle. As the length of wire 16 extending from the member 27 is heated and softened, it tends to follow a curved path. The nozzle is specially shaped to avoid electrical contact with the wire and further to have its outer end centered about the wire at that point. With the gun to be maintained at the illustrated inclination, the nozzle is offset from the axis of the member 27 and is bent, at 36, to meet those requirements. Since the plurality of ports 34 evenly distribute shielding gas about the circumference of the nozzle, the shape of the nozzle ensures even gas coverage of the arc forming end of the wire and the still molten metal deposited in the joint. Complete coverage of the arc is important to maintain finished weld characteristics.

The exemplary apparatus described above points up the combination of features which permits effective gas shielded arc welding resistive heating of the welding wire. Various features and welding parameters may be varied, for example, in different applications. However, as with most welding processes, it is not always possible to freely vary each parameter independently without affecting the finished weld.

To describe exemplary welding parameters effectively employed with apparatus similar to that described above, the shielding gas is comprised of generally pure or industrial grade carbon dioxide which is particularly effective to maintain suitable weld characteristics and is economical. The flux cored wire has an O.D. of 0.093" and is maintained, during welding with an extended or resistively heated length of 2½". The extended length of the wire may be of any value within the range of approximately 1½ to 3", for example, and still provide satisfactory weld characteristics. The D.C. source 14 is conditioned to maintain negative polarity and provide 450 amps and 36 volts during welding. It has been found that these conditions, in most standard weld joints, permit deposition of as much as 28 pounds of weld metal per hour without spattering and with excellent finished weld characteristics.

To make a large volume, generally flat position weld, whether in a bevel, fillet, J-joint or groove type weld joint, for example, the use of 540 amps and 42 volts, with the other parameters as above, has been found to permit deposition of as much as 36 pounds of weld metal per hour with very satisfactory finished weld characteristics.

What is claimed is:

1. Arc welding apparatus comprising flux-cored wire and a welding gun for feeding an end of the wire into contact with material to be welded, the gun having an electrical contact member engageable with the wire at a point remote from its end so that the flux-cored wire is sufficiently extended along an inclined path therefrom to be substantially softened during welding by resistance heating along an extended unsupported length comprising said inclined path, means associated with the electrical contact member and weld material for applying negative polarity to cause an arc upon contact of said end with said weld material, a source of shielding gas, a tubular nozzle extending from the gun to surround said extended length of flux-cored wire in spaced relationship thereto and terminating near its end, said nozzle being shaped to generally conform to a curved path of said wire resulting from drooping of the wire throughout its inclined softened extended length and thus being free of electrical contact therewith, said nozzle serving to conduct the shielding gas past the extended length of wire and maintain effective gas shielding at the end of the wire while the arc is struck, said end of said wire being centered relative to said terminal end of said nozzle when the degree of said droop of said extended length indicates the optimum amount of resistance heating thereof.

2. The combination of claim 1 wherein the shielding gas is composed of substantially pure carbon dioxide.

3. The combination of claim 1 wherein the nozzle is adjustably secured to the gun for varying the nozzle position to accommodate different extended lengths of the flux-cored wire.

4. The combination of claim 3 wherein the welding gun is of the semi-automatic hand held type.

5. In a method of arc welding where weld metal is deposited in a weld joint to form a bond, the steps comprising
   passing an unsupported end of a flux-cored welding wire through an inclined path within a gas conducting nozzle to a point in contact with the weld joint,
   applying electrical voltage over an extended length of said wire including said inclined path between the weld joint and an electrical contact point remote from its end to form an arc between the wire end and the weld joint with negative polarity and to resistivity heat and substantially soften the wire throughout said extended length during welding thereby causing said wire to droop to follow a curved path,
   shielding the arc formed between the wire end and joint with gas passed through said nozzle, and
   feeding the flux-cored wire toward the weld joint under selected voltage and welding speeds to maintain said extended length and said droop generally constant as determined by the position of said arc forming end with respect to the remote end of said nozzle.

6. The method of claim 5 wherein the shielding gas is substantially pure carbon dioxide.

References Cited

UNITED STATES PATENTS

| | | | |
|---|---|---|---|
| 2,797,306 | 6/1957 | Qualey | 219—130 |
| 3,018,360 | 1/1962 | Engel | 219—130 |
| 3,211,883 | 10/1965 | Zimmermann | 219—130 X |
| 3,243,571 | 3/1966 | Schmerling | 219—130 |
| 3,418,446 | 12/1968 | Calussen | 219—130 |

JOSEPH V. TRUHE, Primary Examiner

C. L. ALBRITTON, Assistant Examiner

U.S. Cl. X.R.

219—130